US012566027B2

(12) United States Patent
Allgeier et al.

(10) Patent No.: US 12,566,027 B2
(45) Date of Patent: Mar. 3, 2026

(54) BOTTLE LOCKING ASSEMBLY FOR A DOMESTIC APPLIANCE

(71) Applicant: Haier US Appliance Solutions, Inc., Wilmington, DE (US)

(72) Inventors: Brian Allgeier, Louisville, KY (US); Jonathan Charles Crosby, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 38 days.

(21) Appl. No.: 18/613,851

(22) Filed: Mar. 22, 2024

(65) Prior Publication Data

US 2025/0297801 A1 Sep. 25, 2025

(51) Int. Cl.
*F25D 31/00* (2006.01)
*A47B 73/00* (2006.01)
*E05B 47/00* (2006.01)
*E05B 65/00* (2006.01)
*F25D 25/02* (2006.01)

(52) U.S. Cl.
CPC .......... *F25D 31/007* (2013.01); *A47B 73/006* (2013.01); *E05B 65/0042* (2013.01); *F25D 25/02* (2013.01); *E05B 47/0001* (2013.01); *F25D 2331/803* (2013.01)

(58) Field of Classification Search
CPC .. F25D 31/007; F25D 25/02; F25D 2331/803; A47B 73/006; E05B 65/0042; E05B 47/0001
See application file for complete search history.

(56) References Cited

U.S. PATENT DOCUMENTS 1,710,621 A * 4/1929 Henderson ............ F25D 31/007 221/87
1,920,515 A * 8/1933 Marsden ............ B65D 21/0202 62/437
2,408,444 A * 10/1946 Payne ..................... G07F 11/52 221/281
2,986,304 A * 5/1961 Barnhart ................. G07F 11/30 221/125

(Continued)

FOREIGN PATENT DOCUMENTS

CN 205119634 U * 3/2016 ............. F25D 23/04
CN 103597303 B * 8/2016 ............. F25D 23/04

(Continued)

*Primary Examiner* — Hanh V Tran
(74) *Attorney, Agent, or Firm* — Dority & Manning, P.A.

(57) ABSTRACT

A wine storage appliance may include a cabinet defining a chamber. The wine storage appliance may also include a bottle locking assembly for selectively locking one or more bottles within the chamber. The bottle locking assembly may include a fascia assembly defining one or more bottle openings therethrough. Each bottle opening of the one or more bottle openings for receiving a discrete bottle therethrough. The bottle locking assembly further may include one or more iris assemblies including one or more movable locking blades positioned within the fascia assembly. The one or more iris assemblies transitionable across the one or more bottle openings between an unlocked position or a locked position for selectively unlocking or locking a discrete bottle within a discrete bottle opening.

14 Claims, 7 Drawing Sheets

(56) References Cited

U.S. PATENT DOCUMENTS

| | | | | | |
|---|---|---|---|---|---|
| 3,500,649 | A * | 3/1970 | Feldman | F25D 25/00 62/3.6 |
| 6,363,739 | B1 * | 4/2002 | Hodosh | A45C 11/20 62/457.7 |
| 9,423,168 | B1 * | 8/2016 | Rosso | F25D 3/08 |
| 9,668,573 | B2 * | 6/2017 | Salani | B65D 25/54 |
| 10,737,836 | B2 * | 8/2020 | Carpenter | B65D 23/065 |
| 11,191,355 | B2 * | 12/2021 | Wang | A47B 73/004 |
| 2013/0200014 | A1 * | 8/2013 | Canete Schlatter | G07F 11/24 211/8 |
| 2020/0018542 | A1 * | 1/2020 | Jafa | F25D 27/00 |

FOREIGN PATENT DOCUMENTS

| | | | | | |
|---|---|---|---|---|---|
| DE | 102010043241 | A1 * | 5/2012 | F25D 25/02 |
| DE | 102020132890 | A1 | 6/2022 | |
| EP | 0382915 | A1 * | 8/1990 | B67D 1/0858 |
| FR | 2661084 | A1 * | 10/1991 | F25B 21/04 |
| JP | 05345544 | A * | 12/1993 | |
| JP | 2015058837 | A * | 3/2015 | B60N 3/106 |
| KR | 19990017792 | A * | 3/1999 | F25D 23/00 |
| KR | 19990017793 | A * | 3/1999 | |
| KR | 100232849 | B1 | 12/1999 | |
| KR | 20070018168 | A * | 2/2007 | A47F 3/043 |
| KR | 20250012348 | A * | 1/2025 | F25B 21/02 |
| WO | WO2012046203 | A1 | 4/2012 | |

* cited by examiner

BOTTLE LOCKING ASSEMBLY FOR A DOMESTIC APPLIANCE

FIELD OF THE DISCLOSURE

The present subject matter relates generally to a domestic appliance, and more particularly to a bottle locking assembly for a domestic appliance.

BACKGROUND OF THE DISCLOSURE

Domestic appliances, such as refrigerator appliances, often define one or more chilled chambers for receipt of food items or beverages for storage. In addition, refrigerator appliances include one or more doors rotatably hinged to the cabinet to permit selective access to items stored in chilled chamber(s). The refrigerator appliances can also include various storage components mounted within the chilled chamber and designed to facilitate storage of various items therein. For example, some refrigerator appliances may be designed to receive bottles, such as common seven hundred fifty (750) milliliter bottles of wine. Such refrigerator appliances may be referred to as wine storage appliances.

Wine storage appliances are commonly positioned within a recess in a row of cabinets mounted to a wall in a kitchen. However, current wine storage appliances can have numerous drawbacks. Specifically, under the counter wine storage appliances can present problems or inconveniences for a user. For example, wine bottles stored within the wine storage appliance may be easily accessible to children or minors. As another example, expensive or rare wine bottles that may be stored within the wine storage appliance may be easily accessible to individuals other than the user, e.g., guests of the user. As yet another example, management and organization of wine bottles within the wine storage appliance may be difficult. For instance, wine bottles are typically positioned on their side within the wine storage appliance. In such instances, a user may have difficulty searching through the wine storage appliance for a specific bottle.

Accordingly, a refrigerator appliance that obviates one or more of the above-mentioned drawbacks would be beneficial.

BRIEF DESCRIPTION OF THE DISCLOSURE

Aspects and advantages of the invention will be set forth in part in the following description, or may be obvious from the description, or may be learned through practice of the invention.

In one exemplary aspect of the present disclosure, a wine storage appliance is provided. The wine storage appliance may include a cabinet defining a chamber. The wine storage appliance may also include a bottle locking assembly for selectively locking one or more bottles within the chamber. The bottle locking assembly may include a fascia assembly defining one or more bottle openings therethrough. Each bottle opening of the one or more bottle openings for receiving a discrete bottle therethrough. The bottle locking assembly further may include one or more iris assemblies including one or more movable locking blades positioned within the fascia assembly. The one or more iris assemblies transitionable across the one or more bottle openings between an unlocked position or a locked position for selectively unlocking or locking a discrete bottle within a discrete bottle opening.

In another exemplary aspect of the present disclosure, a domestic appliance is provided. The domestic appliance may define a vertical direction, a lateral direction, and a transverse direction. The domestic appliance may include a cabinet defining a chamber. The domestic appliance may also include a tray assembly positioned within the chamber. The tray assembly may be provided for holding one or more bottles. The domestic appliance may also include a bottle locking assembly for selectively locking one or more bottles within the chamber. The bottle locking assembly may include a fascia assembly attached to a front of the tray assembly. The fascia assembly may define one or more bottle openings therethrough. Each bottle opening of the one or more bottle openings may receive a discrete bottle therethrough. The bottle locking assembly may also include one or more iris assemblies that may include one or more movable locking blades positioned within the fascia assembly. The one or more iris assemblies transitionable between an unlocked position or a locked position for selectively unlocking or locking a discrete bottle within a discrete bottle opening.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
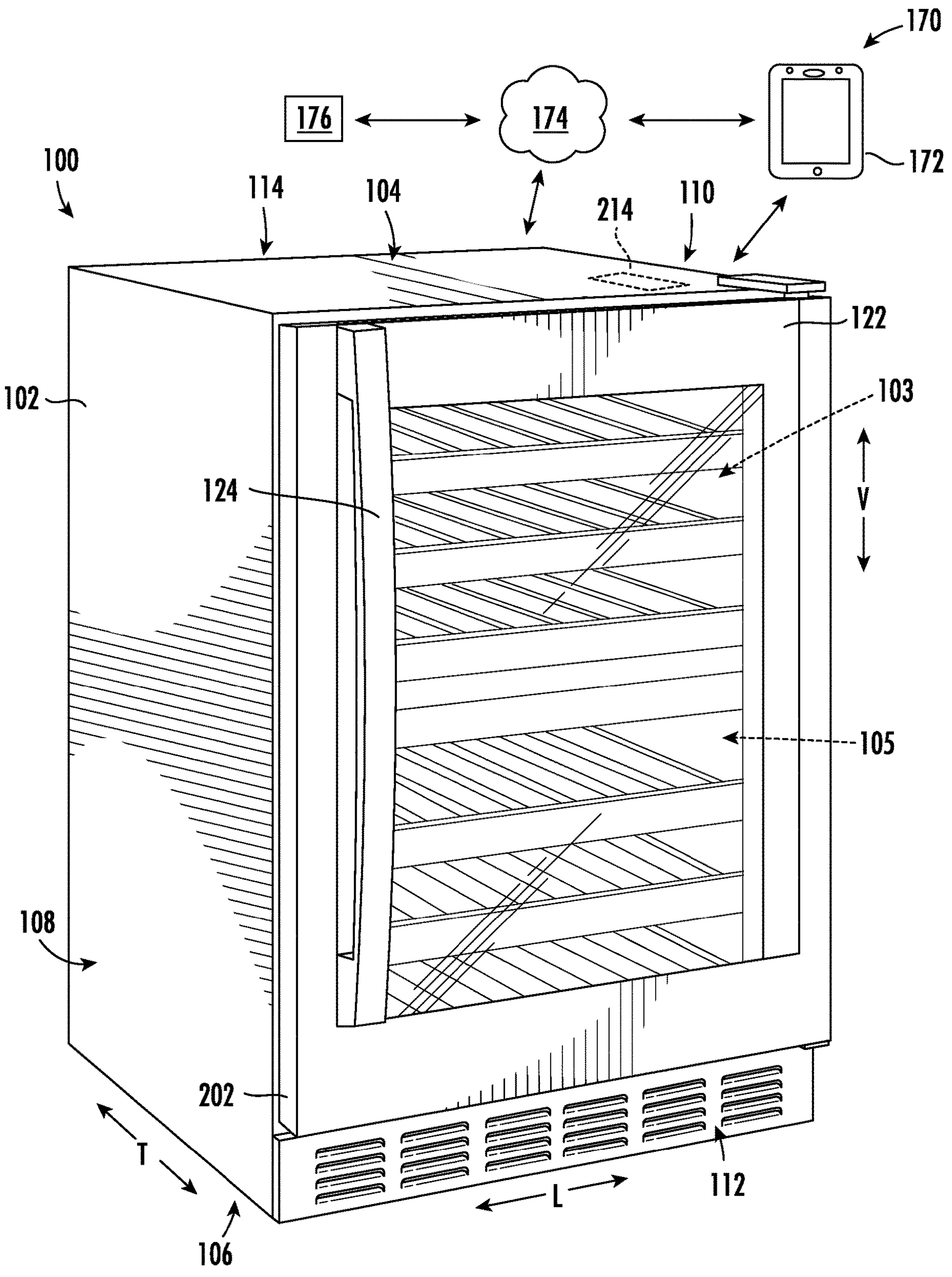
FIG. 1 provides a top perspective view of a wine storage appliance according to exemplary embodiments of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components or systems. For example, the approximating language may refer to being within a 10 percent margin (i.e., including values within ten percent greater or less than the stated value). In this regard, for example, when used in the context of an angle or direction, such terms include within ten degrees greater or less than the stated angle or direction (e.g., "generally vertical" includes forming an angle of up to ten degrees in any direction, such as, clockwise or counterclockwise, with the vertical direction V).

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations.

Except as explicitly indicated otherwise, recitation of a singular processing element (e.g., "a controller," "a processor," "a microprocessor," etc.) is understood to include more than one processing element. In other words, "a processing element" is generally understood as "one or more processing element." Furthermore, barring a specific statement to the contrary, any steps or functions recited as being performed by "the processing element" or "said processing element" are generally understood to be capable of being performed by "any one of the one or more processing elements." Thus, a first step or function performed by "the processing element" may be performed by "any one of the one or more processing elements," and a second step or function performed by "the processing element" may be performed by "any one of the one or more processing elements and not necessarily by the same one of the one or more processing elements by which the first step or function is performed." Moreover, it is understood that recitation of "the processing element" or "said processing element" performing a plurality of steps or functions does not require that at least one discrete processing element be capable of performing each one of the plurality of steps or functions.

Figure 2:
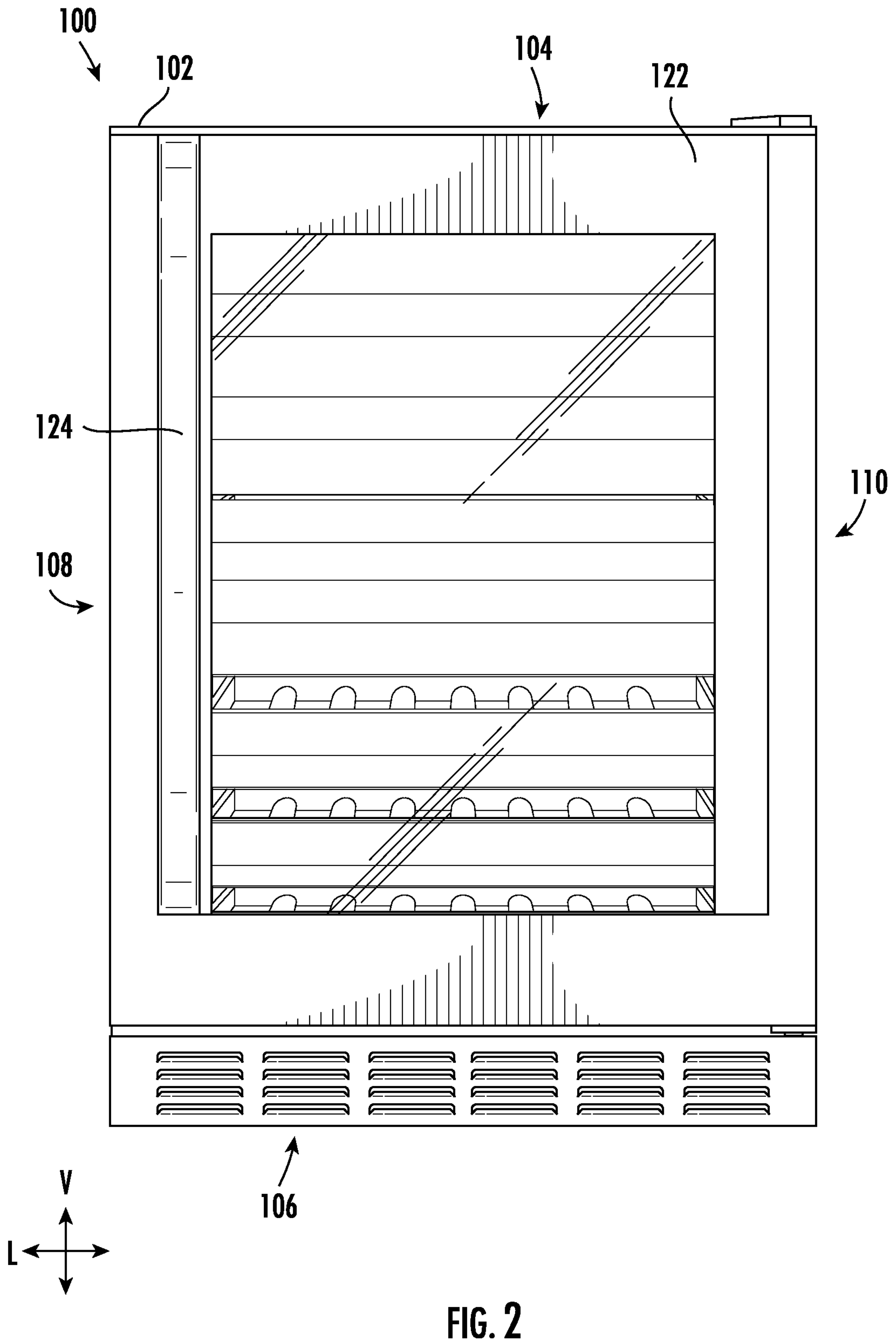
FIG. 2 provides an elevation view of the exemplary wine storage appliance of FIG. 1, wherein the door is in a closed position.
Figure 3:
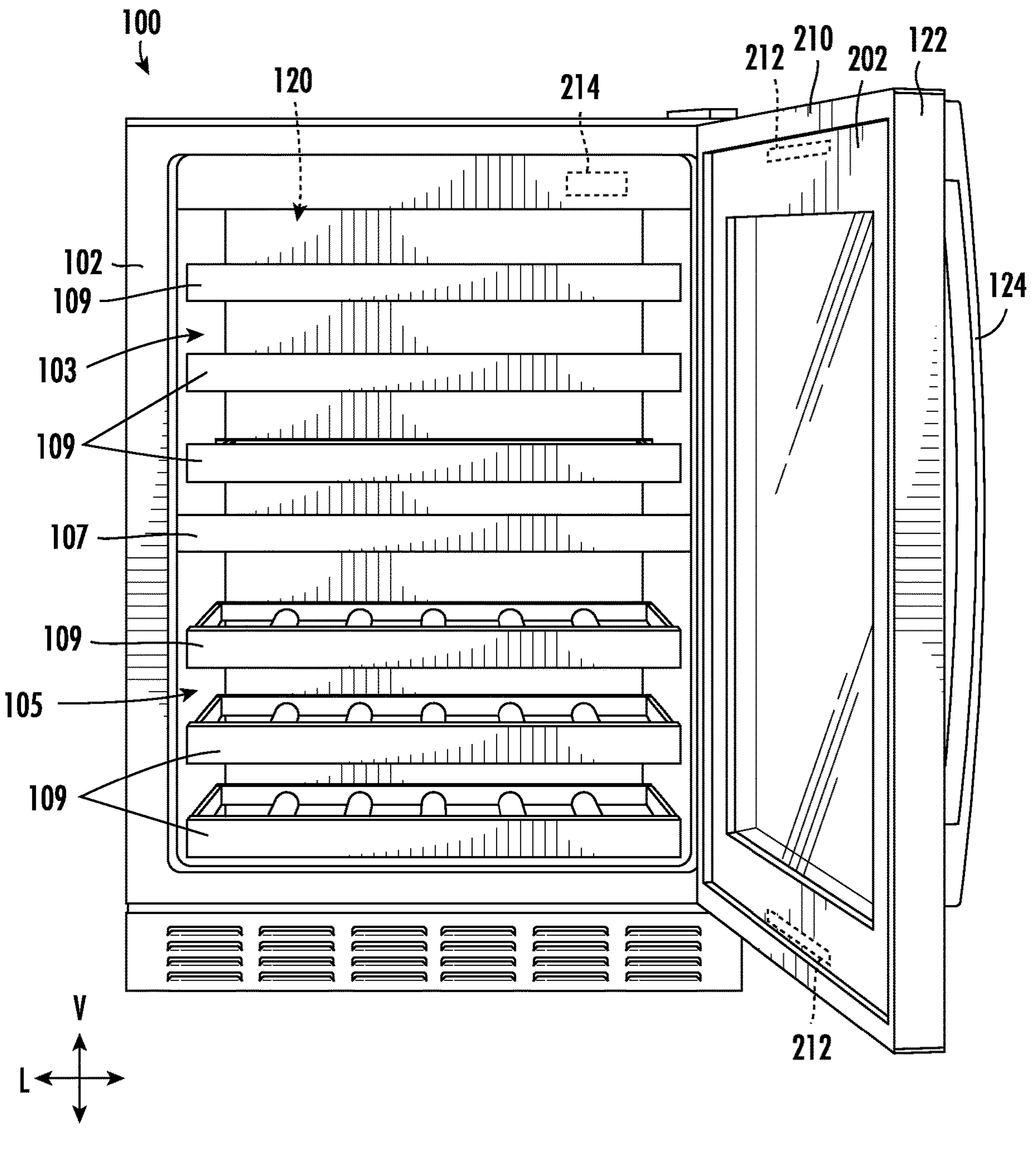
FIG. 3 provides an elevation view of the exemplary wine storage appliance of FIG. 1, wherein the door is in an open position.

FIG. 1 is a perspective view of an appliance, such as a refrigerator appliance or a wine storage appliance 100, according to exemplary embodiments of the present disclosure. FIGS. 2 and 3 provide elevation views of wine storage appliance 100. As may be seen in FIGS. 1 through 3, wine storage appliance 100 includes a housing or cabinet 102 that extends between a top 104 and a bottom 106 along a vertical direction V, between a first side 108 and a second side 110 along a lateral direction L, and between a front side 112 and a rear side 114 along a transverse direction T. Each of the vertical direction V, lateral direction L, and transverse direction T are mutually perpendicular to one another.

Cabinet 102 defines one or more chilled chambers for receipt of items, e.g., wine bottles such as standard 750 milliliter wine bottles, for storage. For instance, the exemplary cabinet 102 may include a first chilled chamber 103 and a second chilled chamber 105. The first chilled chamber 103 may be thermally separate from the second chilled chamber 105, e.g., along the vertical direction V. In some embodiments, an interior chamber wall 107 separates the first chilled chamber 103 from the second chilled chamber 105. One or more trays 109 may be positioned within the one or more chambers, e.g., within the first chilled chamber 103 or the second chilled chamber 105. The one or more trays 109 may be configured to hold one or more bottles. For example, the one or more trays 109 may be configured to hold one or more bottles, e.g., wine bottles 302. Typically, the bottles may be standard 750-millimeter wine bottles. Cabinet 102 may be insulated and wine storage appliance 100 may further include a sealed system (not shown) or other suitable cooling assembly that is operable to cool the first chilled chamber 103 or the second chilled chamber 105 and items stored therein. In this regard, the wine storage appliance 100 may in some instances be referred to as a "wine chiller."

However, in additional or alternative exemplary embodiments, the bottles may be any suitable size, shape, or type of bottle. For example, the bottles may be water bottles, soda bottles, spirit bottles, or any suitable bottle that may require refrigeration.

Referring still to FIGS. 1 through 3, a door 122 is movably mounted or coupled to cabinet 102 such that a user may move (e.g., rotate or translate) door 122 open to access and interior of cabinet 102 (e.g., the first chilled chamber 103 or the second chilled chamber 105). In addition, the user may move door 122 closed to seal the interior of cabinet 102. Thus, door 122 is generally movable between a closed position (e.g., FIGS. 1 and 2) and a fully open position (e.g., FIG. 3). Door 122 includes a door frame 202 that supports one or more cosmetic or insulating panels. As would be understood, such cosmetic or insulating panels may be mounted to the door frame 202 and physically or visually block access to the chilled chambers (e.g., the first chilled chamber 103 or the second chilled chamber 105) in the closed position. In the illustrated embodiments, one or more of the panels includes a glass (e.g., glass, glass ceramic, or transparent polymer) pane for viewing the contents of the one or more chilled chambers (e.g., in the closed position) and also assist with insulating the one or more chilled chambers. A seal or gasket 210 extends between door 122 and cabinet 102 (e.g., when the corresponding door 122 is in the closed position). The gasket 210 may assist with maintaining chilled air within the first chilled chamber 103 or the second chilled chamber 105 and preventing heat from leaking into the same when the door 122 is in the closed position. In some embodiments, door 122 includes a handle 124 that a user may pull when opening and closing door 122.

As further illustrated in FIGS. 2 and 3, one or more electric components 212 may be attached to or supported on door frame 202 (e.g., directly or indirectly to move therewith relative to cabinet 102). In the illustrated embodiments, the electric elements include one or more light sources (e.g., light bulbs, light-emitting diodes, etc.) for illuminating the first chilled chamber 103 or the second chilled chamber 105 (e.g., when door 122 is in the closed position). Nonetheless, further embodiments may include additional or alternative electric embodiments, such as an electronic display, input buttons, resistive heating elements (e.g., for mitigating or preventing condensation), or any other suitable electric element attached to door 122 to move or rotate therewith. As will be described in more detail below, a bottle locking assembly 300 may be electrically connected to cabinet 102, such as to draw power from a power source or inverter or to otherwise communicate one or more electric signals (e.g., data signals) between separate features mounted to cabinet 102, such as a controller or processing device 214 (e.g., microprocessors, microcontrollers, application-specific integrated circuits (ASICS), CPUs or the like, such as general or special purpose microprocessors operable to execute programming instructions or micro-control code associated with operation of appliance 100).

Referring now specifically to FIG. 1, a schematic diagram of an external communication system 170 will be described according to an exemplary embodiment of the present subject matter. In general, external communication system 170 is configured for permitting interaction, data transfer, and other communications between wine storage appliance 100 and one or more external devices. For example, this communication may be used to provide and receive operating parameters, user instructions or notifications, performance characteristics, user preferences, or any other suitable information for improved performance of wine storage appliance 100. In addition, it should be appreciated that external communication system 170 may be used to transfer data or other information to improve performance of one or more external devices or appliances or improve user interaction with such devices.

For example, external communication system 170 permits controller or processing device 214 of wine storage appliance 100 to communicate with a separate device external to wine storage appliance 100, referred to generally herein as an external device 172. As described in more detail below, these communications may be facilitated using a wired or wireless connection, such as via a network 174. In general, external device 172 may be any suitable device separate from wine storage appliance 100 that is configured to provide or receive communications, information, data, or commands from a user. In this regard, external device 172 may be, for example, a personal phone, a smartphone, a tablet, a laptop or personal computer, a wearable device, a smart home system, or another mobile or remote device.

In addition, a remote server 176 may be in communication with wine storage appliance 100 or external device 172 through network 174. In this regard, for example, remote server 176 may be a cloud-based server 176, and is thus located at a distant location, such as in a separate state, country, etc. According to an exemplary embodiment, external device 172 may communicate with a remote server 176 over network 174, such as the Internet, to transmit/receive data or information, provide user inputs, receive user notifications or instructions, interact with or control wine storage appliance 100, etc. In addition, external device 172 and remote server 176 may communicate with wine storage appliance 100 to communicate similar information.

In general, communication between wine storage appliance 100, external device 172, remote server 176, or other user devices or appliances may be carried using any type of wired or wireless connection and using any suitable type of communication network, non-limiting examples of which are provided below. For example, external device 172 may be in direct or indirect communication with wine storage appliance 100 through any suitable wired or wireless communication connections or interfaces, such as network 174. For example, network 174 may include one or more of a local area network (LAN), a wide area network (WAN), a personal area network (PAN), the Internet, a cellular network, any other suitable short- or long-range wireless networks, etc. In addition, communications may be transmitted using any suitable communications devices or protocols, such as via Wi-Fi®, Bluetooth®, Zigbee®, wireless radio, laser, infrared, Ethernet type devices and interfaces, etc. In addition, such communication may use a variety of communication protocols (e.g., TCP/IP, HTTP, SMTP, FTP), encodings or formats (e.g., HTML, XML), or protection schemes (e.g., VPN, secure HTTP, SSL).

External communication system 170 is described herein according to an exemplary embodiment of the present subject matter. However, it should be appreciated that the exemplary functions and configurations of external communication system 170 provided herein are used only as examples to facilitate description of aspects of the present subject matter. System configurations may vary, other communication devices may be used to communicate directly or indirectly with one or more associated appliances, other communication protocols and steps may be implemented, etc. These variations and modifications are contemplated as within the scope of the present subject matter.

Although wine storage appliance 100 is illustrated as a wine chiller, it should be appreciated that aspects of the present disclosure may be applied to other types of appliances, such as bottom mount refrigerator appliances, top mount refrigerator appliances, and side-by-side refrigerator appliances. Moreover, aspects of the present disclosure may be applied to standalone cabinets or bottle housings, such as standalone cabinets or bottles housing that define non-chilled chamber(s) for storing bottles.

Figure 4:
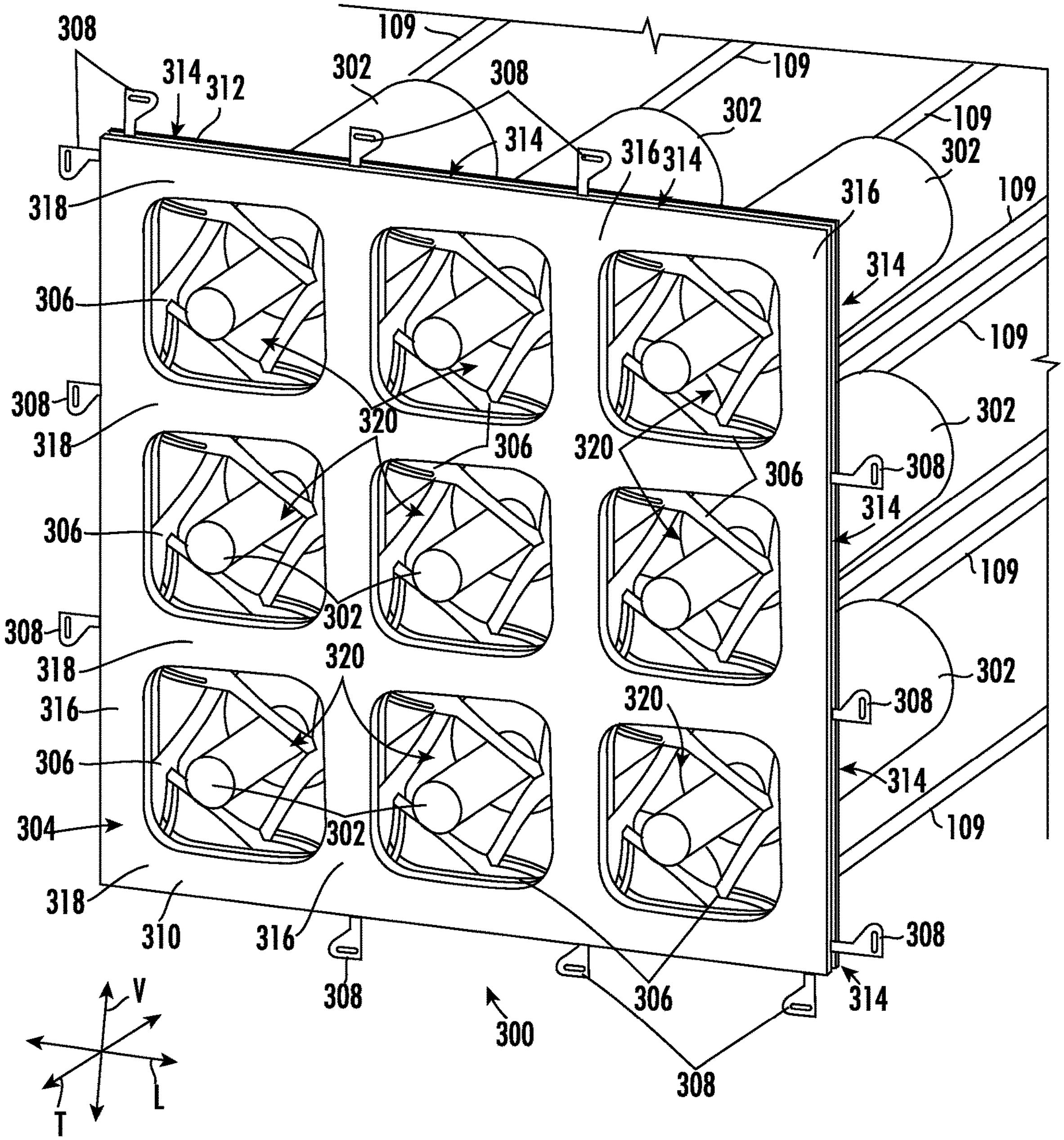
FIG. 4 provides a perspective view of an exemplary bottle locking assembly that may be incorporated into the exemplary wine storage appliance of FIG. 1 according to exemplary embodiments of the present disclosure.

Referring now to FIG. 4, a perspective view of a bottle locking assembly 300 according to one or more exemplary aspects of the present subject matter is provided. The exemplary bottle locking assembly 300 may be positioned within the cabinet 102 of the wine storage appliance 100. Particularly, the bottle locking assembly 300 may be positioned in front of, and attached to, the one or more trays 109 positioned within the one or more chilled chambers, e.g., within the first chilled chamber 103 or within the second chilled chamber 105. The bottle locking assembly 300 may selectively lock one or more bottles, e.g., wine bottles 302, that may be held or positioned on the one or more trays 109.

In some embodiments, the bottle locking assembly 300 includes a fascia assembly 304, one or more iris assemblies 306, and one or more actuating members 308. The fascia assembly 304 may house or otherwise support the plurality of iris assemblies 306 or the plurality of actuating members 308. In addition, the fascia assembly 304 may function as a cosmetic or aesthetic piece of the bottle locking assembly 300. The fascia assembly 304 may include an outer plate 310 and an inner plate 312. The outer plate 310 may be positioned outside, e.g., along the transverse direction T, of the inner plate 312. For instance, the outer plate 310 may be positioned closer to the front of the refrigerator appliance than the inner plate 312. In this regard, the outer plate 310 of the fascia assembly 304 may be seen by a user of the wine storage appliance 100.

The outer plate 310 and the inner plate 312 may be coupled together, e.g., along the transverse direction T, to define one or more compartments 314 therebetween. In some embodiments, the fascia assembly 304 includes a predetermined number of vertical members 316, e.g., members of the outer plate 310 or the inner plate 312 that extend along the vertical direction V. In some embodiments, the fascia assembly 304 also includes a predetermined number of horizontal members 318, e.g., members of the outer plate 310 or the inner plate 312 that extend along the lateral direction L. The vertical members 316 of the fascia assembly 304 may be spaced apart along the lateral direction L. The horizontal members 318 of the fascia assembly 304 may be spaced apart along the vertical direction V. Together, the vertical members 316 and the horizontal members 318 may define a plurality of bottle openings 320. Each bottle opening of the plurality of bottle openings 320 may be configured to receive a bottle, e.g., wine bottle 302, therethrough. For instance, each bottle opening of the plurality of bottle openings 320 may define a diameter greater than at least a portion of a standard wine bottle.

Although, the exemplary fascia assembly 304 is illustrated to define an array of bottle openings 320, it should be appreciated that in additional or alternative embodiments, the fascia assembly 304 may define one or more bottle openings 320 in positioned any suitable manner, such as single bottle opening, a single row of bottle openings, or a single column of bottle openings. Moreover, the size of each bottle opening may be configured such that any suitable size or shape bottle or container may be received therethrough. For example, in additional or alternative exemplary embodiments, the one or more bottle openings defined through the fascia assembly 304 may be configured to receive soda bottles, water bottles, spirit bottles, or any suitable type or style of bottle or container.

The plurality of iris assemblies 306 of the bottle locking assembly 300 may be positioned between the outer plate 310 and the inner plate 312, e.g., within the one or more compartments 314 defined between the outer plate 310 or the inner plate 312 therebetween. For example, referring now to FIGS. 5 and 6, close-up views of a portion of the bottle locking assembly 300 is provided. In the exemplary embodiment, the outer plate 310 of the fascia assembly 304 has been removed to reveal a discrete iris assembly 307 of the plurality of iris assemblies 306. As should be appreciated, the discrete iris assembly 307 is described herein for brevity and clarity only. It should be appreciated that the structure, configuration, and function of each iris assembly of the plurality of iris assemblies 306 may be substantively similar or identical to the exemplary discrete iris assembly 307 described herein.

The iris assembly 307 may be positioned around a respective bottle opening 320 to selectively adjust the size of the respective bottle opening 320. For instance, the iris assembly 307 may be configured to expand or contract, e.g., independently of the rest of the plurality of iris assemblies 306, between an unlocked position (e.g., FIG. 5) and a locked position (e.g., FIG. 6). In the unlocked position, the iris assembly 307 may define a maximum opening size for the respective bottle opening 320. The maximum opening size may allow a bottle with a predetermined size, such as wine bottle 302, to pass therethrough. In this regard, in the unlocked position, a user of the wine storage appliance 100 may be capable of removing the bottle from the one or more chilled chambers through the respective bottle opening 320. Additionally or alternatively, in the unlocked position, a user of the wine storage appliance 100 may be capable of inserting the bottle into the one or more chilled chambers through the respective bottle opening 320.

In the locked position, the iris assembly 307 may define a minimum opening size for the respective bottle opening 320. The minimum opening size may correspond to a portion of the bottle that the iris assembly 307 may engage with. For example, the minimum opening size may correspond to a diameter of a neck of the bottle. As another example, the minimum opening size may correspond to diameter of a shoulder of the bottle. As yet another example, the minimum opening size may correspond to diameter of a body of the bottle. Additionally or alternatively, the controller 214 may be programed to include a variable minimum opening size. For instance, the controller 214 may be programmed or may have the ability to detect the size of an object, e.g., a bottle such as a wine bottle, within the opening, and then close to an equivalent cross-sectional area or diameter.

In some embodiments, the iris assembly 307 may include a plurality of locking blades 322. Each locking blade of the plurality of locking blades 322 may be coupled with one of the vertical members 316 or the horizontal members 318 of the fascia assembly 304. Each locking blade of the plurality of locking blades 322 coupled with one of the vertical members 316 of the fascia assembly 304 may be referred to as a "vertical locking blade 324." The vertical locking blades 324 of the plurality of blades 322 may be extended approximately along the vertical direction V from the respective vertical member 316. Each locking blade of the plurality of locking blades 322 coupled with one of the horizontal members 318 of the fascia assembly 304 may be referred to as "horizontal locking blades 326." The horizontal locking blades 326 of the plurality of locking blades 322 may be extended along the lateral direction L when from the respective horizontal member 318.

Figure 5:
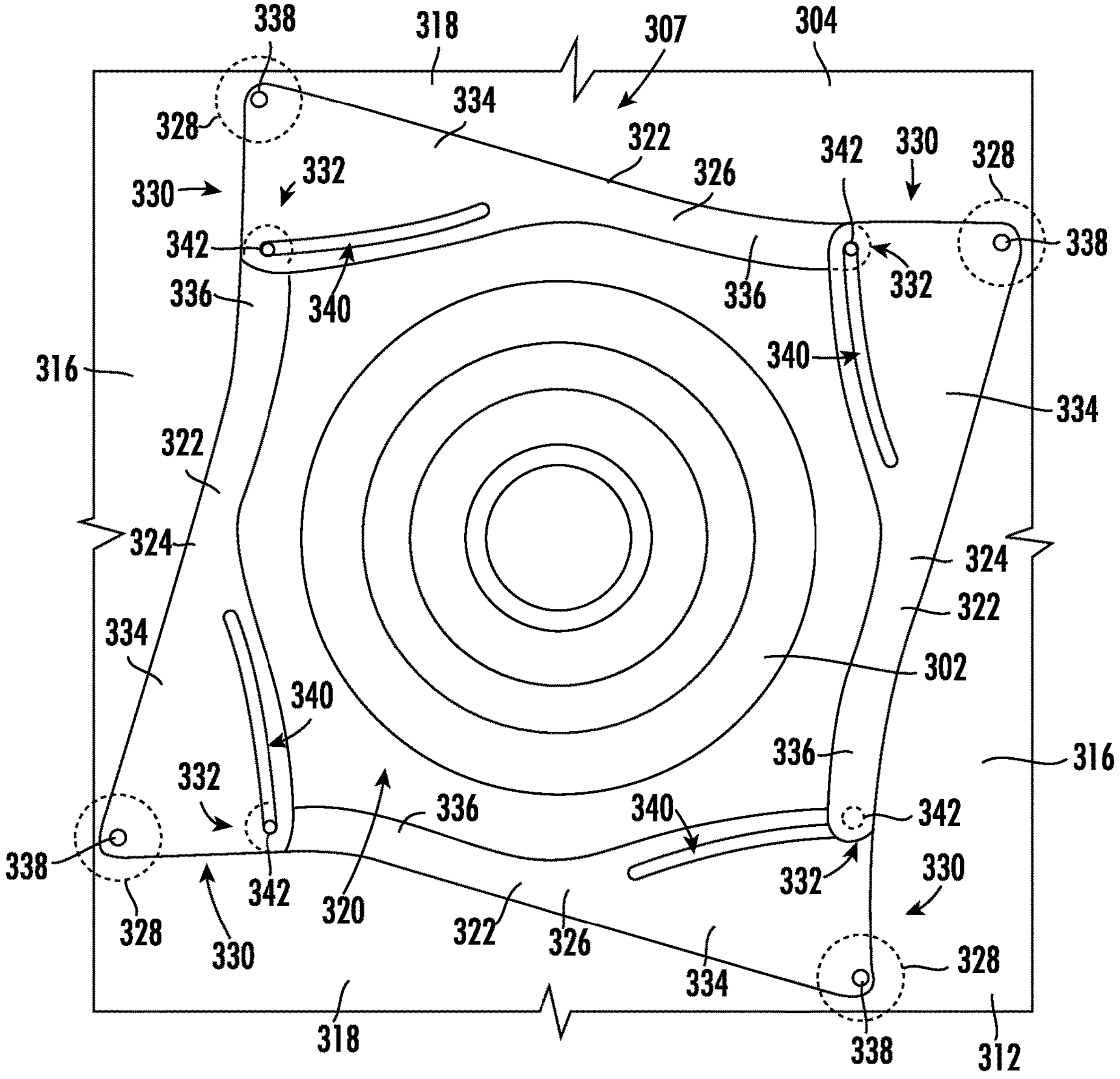
FIG. 5 provides an elevation view of a discrete iris assembly of the exemplary bottle locking assembly of FIG. 4, wherein the discrete iris assembly is in an unlocked position.
Figure 6:
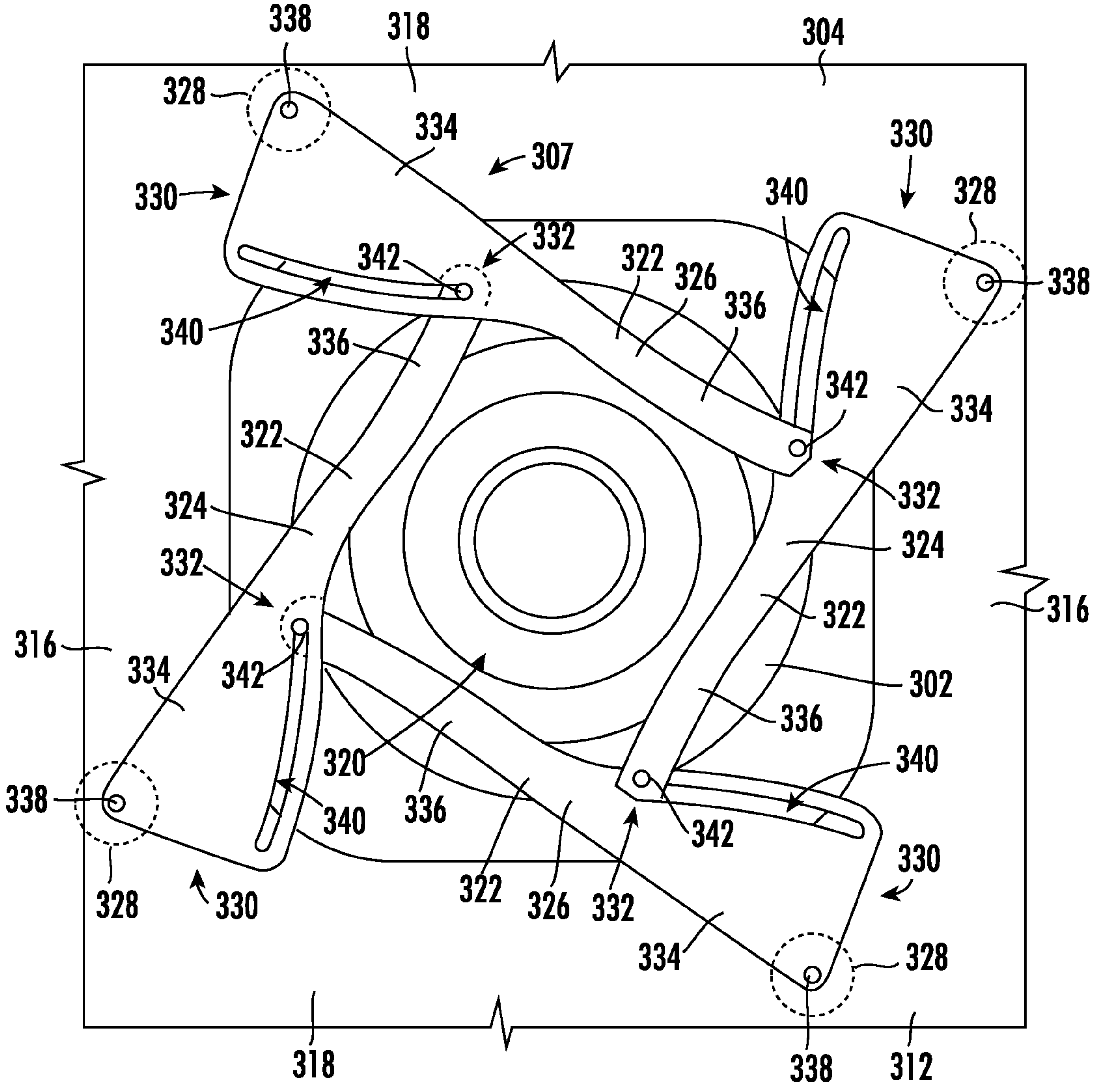
FIG. 6 provides an elevation view of a discrete iris assembly of the exemplary bottle locking assembly of FIG. 4, wherein the discrete iris assembly is in a locked position.

Referring still to FIGS. 5 and 6, each locking blade of the plurality of locking blades 322 may define a proximal end 330 and a distal end 332. Each locking blade of the plurality of locking blades 322 may include a pivot body 334 positioned at the proximal end 330 thereof and a slide body 336 positioned at the distal end 332 thereof. Each locking blade of the plurality of locking blades 322 may form a pivot joint with the fascia assembly 304 at the respective pivot body 334. For example, each locking blade may include a pivot pin 338 extended therefrom, e.g., along the transverse direction T. The pivot pin 338 may be coupled to the fascia assembly 304, and more particularly, the outer plate 310 or the inner plate 312 of the fascia assembly 304, to provide the pivot joint for the respective locking blade of the plurality of locking blades 322.

Each locking blade of the plurality of locking blades 322 may be pivotable or actuatable between a natural position (e.g., FIG. 5) or a forced position (e.g., FIG. 6). For instance, each locking blade of the plurality of locking blades 322 may include a biasing element 328 attached thereto. Particularly, each biasing element 328 may be coupled or attached to the pivot body 334, and more particularly, the pivot pin 338 of the respective locking blade of the plurality of locking blades 322. In this regard, each biasing element 328 may bias the respective locking blade of the plurality of locking blades 322 to or toward the natural position. Each biasing element 328 may be any suitable element or mechanism that is capable of biasing the respective locking blade toward the natural position. For example, each biasing element 328 may be a spring (e.g., a torsional spring) or a resilient plastic clip attached to the respective locking blade of the plurality of locking blades 322.

In some embodiments, each locking blade of the plurality of locking blades 322 includes a slot 340 defined therethrough (e.g., along or parallel to the transverse direction T). Each slot 340 may extend from the proximal end 330 toward the distal end 332 (e.g., along a set path perpendicular to the transverse direction T) of the respective locking blade of the plurality of locking blades 322. The slide body 336 of each locking blade of the plurality of locking blades 322 may include a sliding pin 342. The sliding pin 342 may be extended from the slide body 336, e.g., along the transverse direction T. Each sliding pin 342 may be inserted into the slot 340 of an adjacent locking blade of the plurality of locking blades 322.

As a discrete locking blade of the plurality of locking blades 322 pivots or actuates, e.g., between the natural position and the forced position, the sliding pin 342 of the discrete locking blade of the plurality of locking blades 322 may be capable of sliding within the slot 340 of the adjacent locking blade of the plurality of locking blades 322. In this regard, when two or more of the locking blades of the plurality of locking blades 322 are pivoted or actuated, the iris assembly 307 may be capable of expanding, or contracting, between the unlocked position and the locked position. As will be described in more detail below, two or more of the locking blades of the plurality of locking blades 322 must be simultaneously pivoted or actuated, e.g., from the natural position to the forced position or from the forced position to the natural position, to transition the iris assembly 307 between the unlocked position to the locked position.

Figure 7:
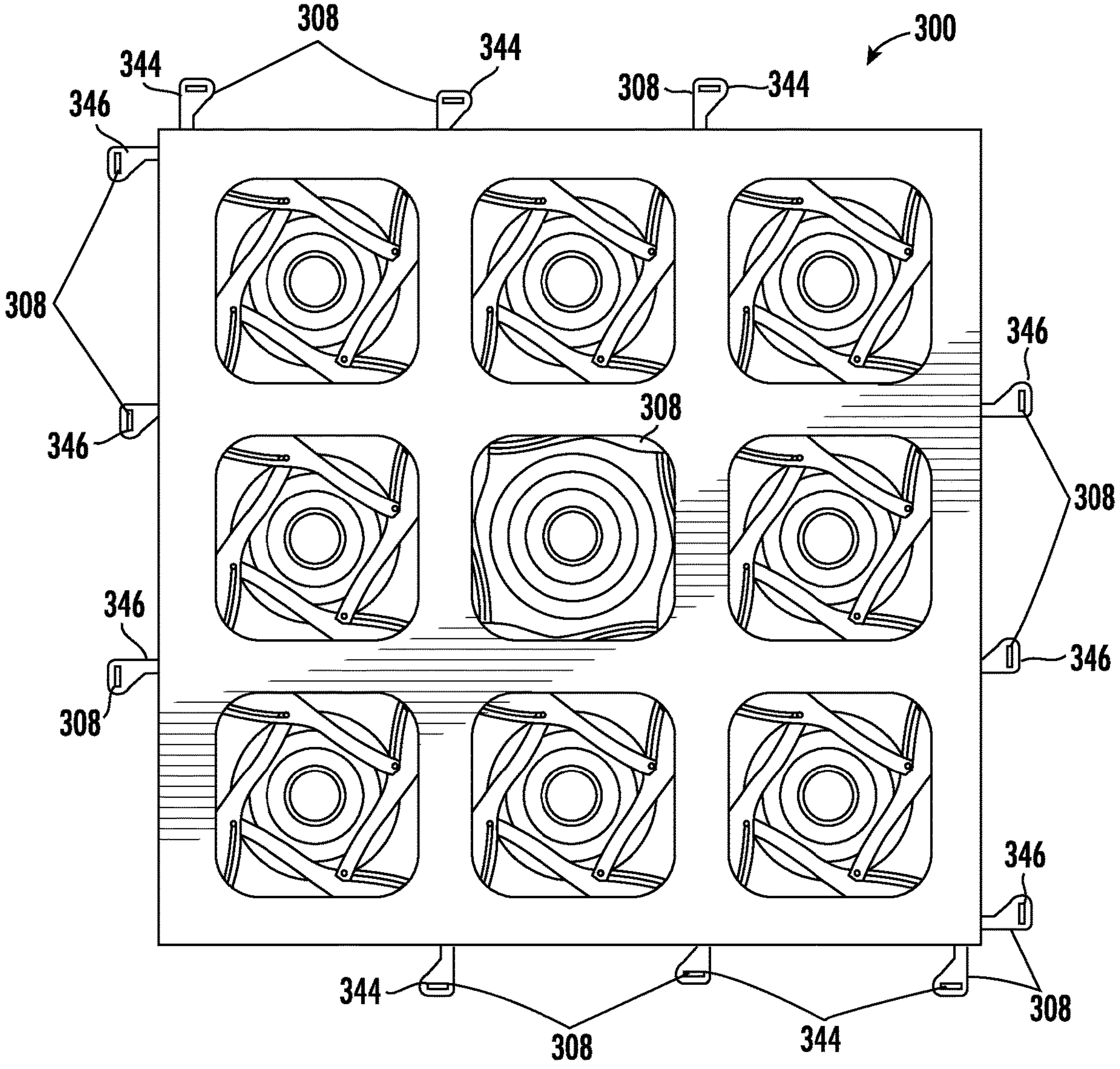
FIG. 7 provides an elevation view of the exemplary bottle locking assembly of FIG. 4.

Referring now to FIG. 7, an elevation view of the bottle locking assembly 300 according to one or more exemplary embodiments of the present subject matter is provided. As mentioned above, the exemplary bottle locking assembly 300 may include the plurality of actuating members 308 extended through the one or more compartments 314 defined by the fascia assembly 304. Each actuating member of the plurality of actuating members 308 may extend along the vertical direction V or the lateral direction L, e.g., through the fascia assembly 304.

Each actuating member of the plurality of actuating members 308 that extends along the vertical direction V may be referred to as a "vertical actuating member 344." In some embodiments, one or more vertical locking blades 324 of plurality of iris assemblies 306 may be coupled with a discrete vertical actuating member 344. For example, as illustrated in FIG. 7, each vertical actuating member 344 of the plurality of actuating members 308 may be coupled with three vertical locking blades 324.

Each actuating member of the plurality of actuating members 308 that extends along the lateral direction L may be referred to as a "horizontal actuating member 346." In some embodiments, one or more horizontal locking blades 326 of plurality of iris assemblies 306 may be coupled with a discrete horizontal actuating member 346. For example, as illustrated in FIG. 7, each horizontal actuating member 346 of the plurality of actuating members 308 may be coupled with three horizontal locking blades 326.

Each actuating member of the plurality of actuating members 308 may be moveable, e.g., along the vertical direction V or the lateral direction L, between a de-actuated position and an actuated position. In the de-actuated position, one or more locking blades of one or more iris assemblies 306 coupled with the respective actuating member 308 may be capable of biasing toward the natural position. For instance, in the de-actuated position, the respective actuating member may not apply any force to the one or more locking blades. In this regard, the biasing force applied to the one or more locking blades, e.g., via the respective biasing elements 328, may be capable of keeping the one or more locking blades in the natural position.

However, as should be appreciated, in order to move an iris assembly from a locked position to an unlocked position, all of the locking blades in an iris assembly must be capable of biasing toward the natural position. In other words, in order for any of the locking blades in the iris to actually bias toward their natural positions, all of the actuating members 308 coupled with the respective iris assembly must be moved to the de-actuated position (e.g., simultaneously). For example, if one locking blade in an iris assembly is not capable of biasing toward the natural position, e.g., if the actuating member 308 coupled with the respective locking blade is in the actuated position, all of the locking blades of the respective iris assembly may not actuate toward the natural position.

In the actuated position, the biasing force applied to the one or more locking blades coupled with the respective actuating member, e.g., via the biasing member, may be overcome. For instance, in the actuated position, the respective actuating member may move linearly, e.g., along the vertical direction V or the lateral direction L, away from the fascia assembly 304. This linear movement of the respective actuating member may pull the one or more locking blades to or toward the forced position thereof. In this regard, each locking blade of the plurality of locking blades 322 coupled with the respective actuating member of the plurality of actuating members 308 may be capable of transitioning from the natural position to the forced position.

In additional or alternative embodiments, each iris assembly 306 may include passive locking blades of the plurality of locking blades 322 and active locking blades of the plurality of locking blades 322. For example, in such embodiments, the active locking blades of the plurality of locking blades 322 may be coupled directly with an actuating member of the plurality of actuating members 308 to directly transition the active locking blades between the natural position and the forced position. The passive locking blades of the plurality of locking blades 322 may be attached directly to the fascia assembly 304. Particularly, the pivot body 334 of each passive locking blade may be attached directly fascia assembly 304 and the slide body 336 of each passive locking blade may be slidably attached to a slot 240 defined through an adjacent active locking blade. In such embodiments, only the active locking blades may be required to be actuated simultaneously between the forced position or the natural position to lock or unlock the respective iris assembly.

As should be appreciated, in order for each iris assembly of the plurality of iris assemblies 306 to be moveable, e.g., between the unlocked position and the locked position, each iris assembly must have at least two active locking blades. Particularly, the at least two active locking blades allow each iris assembly of the plurality of iris assembly 306 to be moveable, e.g., between the unlocked position and the locked position, individually, e.g., separate from other iris assemblies.

In some embodiments, each actuating member of the plurality of actuating members 308 may include an actuation element (not depicted) attached thereto. In some embodiments, the actuation elements are positioned within the cabinet 102, such as within one or more of the side walls, top walls, or bottom walls of the cabinet 102. In some embodiments, the actuation elements are in operative communication with the controller 214 such that the controller 214 may selectively actuate the respective actuation member of the plurality of actuating members 308. The actuation element may be any suitable element that is capable of moving or actuating the plurality of actuating members 308, e.g., along the vertical direction V or the lateral direction L. For example, the actuation element may be a linear solenoid, a rotary solenoid, or a servo motor.

In some instance, a user may wish to lock or unlock one or more bottles within the wine storage appliance. For instance, a user may interact with an application on their smartphone, e.g., external device 172, to selectively lock or unlock one or more bottles within the wine storage appliance. In response to a user input indicative of the bottle(s) that the user wishes to retrieve or lock one or more signals may be sent to the bottle locking assembly 300, and more particularly, to one or more actuation elements. The one or more actuation elements may correspond to the plurality of actuation members 308 that are attached to the appropriate iris assembly 306.

As an illustrative example, in order to lock a bottle, such as wine bottle 302, within a discrete bottle opening of the plurality of bottle openings 320, all of the active locking members of the plurality of actuation members 308 must be simultaneously actuated, e.g., via the respective actuation members attached thereto, to or toward the forced position. For example, as illustrated in FIG. 7, all but the centrally most located iris assembly 306 may be in the locked position. In such embodiments, all but the two vertical actuating members 344 of the plurality of actuating members 308 attached to the centrally located iris assembly 306 and the two horizontal actuating members 346 of the plurality of actuating members 308 attached to the centrally located iris assembly 306 have been pulled linearly, e.g., along the vertical direction V or the lateral direction L, away from the fascia assembly 304. In this regard, the actuated actuation members may force each locking blade of the respective iris assemblies 306 from their natural position to their forced position. Thus, the respective iris assemblies 306, e.g., all but the centrally located iris assembly, may be moved from the unlocked position to the locked position.

Conversely, in order to unlock a bottle, such as a wine bottle, 302 from a discrete bottle opening the reverse process may be formed. For example, in order to unlock a bottle from the centrally most located bottle opening, all of the actuating members of the plurality of actuating members 308 attached to the centrally most located iris assembly 306, e.g., all of the actuating members 308 of the plurality of actuating members 308 attached to the plurality of locking blades 322 of the centrally most located iris assembly 306, must be transitioned from the actuated position to the de-actuated position simultaneously. For example, as illustrated in FIG. 7, the two vertical actuating members 344 of the plurality of actuating members 308 attached to the centrally located iris assembly 306 and the two horizontal actuating members 346 of the plurality of actuating members 308 attached to the centrally located iris assembly 306 may be moved or pushed linearly, e.g., along the vertical direction V or the lateral direction L, to the de-actuated position simultaneously. In this regard, each locking blade 322 of the respective iris assembly 306 may be capable of transitioning to its natural position. Thus, the respective iris assembly 306, e.g., the centrally located iris assembly, may be moved to the unlocked position while all other iris assemblies 306 of the plurality of iris assemblies 306 remain in the locked position.

As should be appreciated, even if all but one actuating member attached to the locking blades of a respective iris assembly 306 is in the de-actuated position, the respective iris assembly 306 may remain in the locked position. Particularly, in such an instance, all of the locking blades of the respective iris assembly 306 may be kept in the forced position via the connections formed between the sliding pins 342 and slots 340, e.g., of adjacent locking blades. All locking blades within an iris assembly may relax into the natural position when, and only when, each and every actuating member 308 attached to the respective iris assembly 306 is in the de-actuated position.

According to one or more exemplary embodiments of the present subject matter, the exemplary bottle locking assembly 300 may advantageously provide a lockable bottle, e.g., wine bottle, storage solution for wine storage appliances. Particularly, the plurality of iris assemblies 306 may advantageously expand or contract to selectively lock or unlock a bottle within the respective bottle opening. In the locked position, the respective iris assembly may advantageously prevent unwanted removal of the wine bottle from the wine storage appliance. For example, a child or a guest of the user may be unable to remove a wine bottle from the wine storage appliance when the respective iris assembly is in the locked position. Moreover, the exemplary bottle locking assembly 300 may advantageously facilitate the management and organization of wines within the wine storage appliance. For example, when inserting wine bottles within the wine storage appliance, a user may catalog the location, e.g., the location within the wine storage appliance such as the tray or the column, of each wine bottle in an associated application. When a user wishes to retrieve a bottle, they may select the appropriate bottle within the application on the external device and direct the bottle locking assembly 300 to transition the appropriate iris assembly to the unlocked position.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A wine storage appliance comprising:

a cabinet defining a chamber; and a bottle locking assembly for selectively locking one or more bottles within the chamber, the bottle locking assembly comprising:

a fascia assembly defining one or more bottle openings therethrough, each bottle opening of the one or more bottle openings for receiving a discrete bottle therethrough; and one or more iris assemblies comprising a plurality of locking blades positioned within the fascia assembly, each locking blade of the plurality of locking blades extending between a proximal end and a distal end, each locking blade of the plurality of locking blades comprising a pivot body positioned at the proximal end thereof and a slide body positioned at the distal end thereof, each pivot body defining a slot therethrough that extends from the proximal end toward the distal end of the corresponding locking blade, each pivot body comprising a pivot pin that is rotatably coupled to the fascia to provide a pivot joint, wherein the one or more iris assemblies are transitionable across the one or more bottle openings between an unlocked position or a locked position for selectively unlocking or locking a discrete bottle within a discrete bottle opening, and wherein each locking blade of the plurality of locking blades is pivotably attached to the fascia assembly at the pivot body between a natural position and a forced position.

2. The wine storage appliance of claim 1, wherein the bottle locking assembly further comprises a plurality of actuating members extending within the fascia assembly, wherein each actuating member of the plurality of actuating members is coupled with one or more locking blades of one or more iris assemblies to selectively transition the one or more locking blades between the natural position and the forced position.

3. The wine storage appliance of claim 2, wherein the bottle locking assembly further comprises a plurality of actuation elements, wherein each actuation element of the plurality of actuation elements is coupled with one or more actuating members of the plurality of actuating members to selectively drive actuation of one or more actuating members.

4. The wine storage appliance of claim 2, wherein the plurality of locking blades of each iris assembly comprises at least two active locking blades, wherein the at least two active locking blades may be coupled with an actuating member of the plurality of actuating members to selectively transition the one or more locking blades between the natural position and the forced position.

5. The wine storage appliance of claim 1, wherein the slide body of each locking blade of the plurality of locking blades comprises a sliding pin extended therefrom, and wherein the sliding pin of each locking blade of the plurality of locking blades is slidably positioned within the slot of an adjacent locking blade of the plurality of locking blades.

6. The wine storage appliance of claim 1, wherein each locking blade of the plurality of locking blades comprises a biasing element, wherein the biasing element is coupled to the pivot body to bias the locking blade toward the natural position.

7. The wine storage appliance of claim 1, wherein the fascia assembly comprises an outer plate and an inner plate, wherein the one or more iris assemblies are positioned between the inner plate and the outer plate.

8. A domestic appliance defining a vertical direction, a lateral direction, and a transverse direction, the domestic appliance comprising:

a cabinet defining a chamber;

a tray assembly positioned within the chamber, the tray assembly provided for holding one or more bottles; and a bottle locking assembly for selectively locking one or more bottles within the chamber, the bottle locking assembly comprising:

a fascia assembly attached to a front of the tray assembly, the fascia assembly defining one or more bottle openings therethrough, each bottle opening of the one or more bottle openings for receiving a discrete bottle therethrough; and one or more iris assemblies comprising a plurality of locking blades positioned within the fascia assembly, each locking blade of the plurality of locking blades extending between a proximal end and a distal end, each locking blade of the plurality of locking blades comprising a pivot body positioned at the proximal end thereof and a slide body positioned at the distal end thereof, each pivot body defining a slot therethrough that extends from the proximal end toward the distal end of the corresponding locking blade, each pivot body comprising a pivot pin that is rotatably coupled to the fascia to provide a pivot joint, wherein the one or more iris assemblies are transitionable between an unlocked position or a locked position for selectively unlocking or locking a discrete bottle within a discrete bottle opening, and wherein each locking blade of the plurality of locking blades is pivotably attached to the fascia assembly at the pivot body between a natural position and a forced position.

9. The domestic appliance of claim 8, wherein the bottle locking assembly further comprises a plurality of actuating members extending within the fascia assembly, wherein each actuating member of the plurality of actuating members is coupled with one or more locking blades of one or more iris assemblies to selectively transition the one or more locking blades between the natural position and the forced position.

10. The domestic appliance of claim 9, wherein the bottle locking assembly further comprises a plurality of actuation elements, wherein each actuation element of the plurality of actuation elements is coupled with one or more actuating members of the plurality of actuating members to selectively drive actuation of one or more actuating members.

11. The domestic appliance of claim 9, wherein the plurality of locking blades of each iris assembly comprises at least two active locking blades, wherein the at least two active locking blades may be coupled to an actuating member of the plurality of actuating members to selectively transition the one or more locking blades between the natural position and the forced position.

12. The domestic appliance of claim 8, wherein the slide body of each locking blade of the plurality of locking blades comprises a sliding pin extended therefrom, and wherein the sliding pin of each locking blade of the plurality of locking blades is slidably attached within the slot of an adjacent locking blade of the plurality of locking blades.

13. The domestic appliance of claim 8, wherein each locking blade of the plurality of locking blades comprises a biasing element, wherein the biasing element is coupled to the pivot body to bias the locking blade toward the natural position.

14. The domestic appliance of claim 8, wherein the fascia assembly comprises an outer plate and an inner plate, wherein the one or more iris assemblies are positioned between the inner plate and the outer plate.

* * * * *